United States Patent [19]

Takayanagi et al.

[11] Patent Number: 4,913,255
[45] Date of Patent: Apr. 3, 1990

[54] SHOCK ABSORBER FOR MOTORCYCLE

[75] Inventors: Shinji Takayanagi, Tokyo; Kenji Uehara, Kiyose, both of Japan

[73] Assignee: Honda Giken Kogyo Kabushiki Kaisha, Tokyo, Japan

[21] Appl. No.: 256,946

[22] Filed: Oct. 13, 1988

[30] Foreign Application Priority Data

| Oct. 14, 1987 | [JP] | Japan | 62-257369 |
| Oct. 14, 1987 | [JP] | Japan | 62-257370 |
| Oct. 14, 1987 | [JP] | Japan | 62-257371 |
| Oct. 14, 1987 | [JP] | Japan | 62-257372 |
| Mar. 22, 1988 | [JP] | Japan | 63-68568 |

[51] Int. Cl.[4] ............................................. B62D 61/02
[52] U.S. Cl. ...................................... 180/227; 267/217; 267/277; 280/284
[58] Field of Search ............... 267/217, 277, 274; 180/227; 280/284

[56] References Cited

U.S. PATENT DOCUMENTS

| 2,705,154 | 3/1955 | Torre | 180/227 X |
| 3,948,543 | 4/1976 | MacDonald et al. | 280/284 |
| 4,485,885 | 12/1984 | Fukuchi | 180/227 |
| 4,523,659 | 6/1985 | Yamamoto et al. | 180/227 |

FOREIGN PATENT DOCUMENTS 2102749  2/1983  United Kingdom ............... 180/227

Primary Examiner—George E. A. Halvosa
Attorney, Agent, or Firm—Armstrong, Nikaido, Marmelstein, Kubovcik & Murray

[57] ABSTRACT

A supporting spring and a hydraulic damper are physically separately positioned apart from each other and from the pivot of a swing-arm type subframe of a two or three wheel motorcycle. The operating ends of each are connected to the subframe by a link mechanism. A rotary type damper and a torsion spring are preferred.

9 Claims, 8 Drawing Sheets

SHOCK ABSORBER FOR MOTORCYCLE

BACKGROUND OF THE INVENTION

This invention relates to a shock absorber for a motorcycle such as a two-wheeled or three-wheeled motorcycle or the like.

A conventional shock absorber for a rear wheel of a motorcycle known hitherto is, as disclosed in the unexamined Japanese utility model registration application JIKKAISHO 61-113084, generally such that it comprises a coiled spring and a linear expansion type damper concentrially combined with the spring, and a swing arm and a frame assembly are connected to each other thereby in the vertical direction. There has also been known another type such as disclosed in the unexamined Japanese patent application TOKKAISHO 56-28008 in which there is interposed a coiled spring between a swing arm and a frame assembly as in the foregoing and a rotary type hydraulic damper is employed as a damper therein, said rotary hydraulic damper being so installed as to be concentric with the pivot of the swing arm or positioned right above said pivot. There has also been known still another type such as proposed by the applicant of this application in the unexamined Japanese patent application TOKKAISHO 62-46037 in which a rotary type hydraulic damper is connected to a frame assembly and to a swing arm via a link mechanism, and the swing arm is pivotally supported on the frame assembly through a torsion bar.

Of these prior art examples, the first linear expansion type shock absorber has to use a long coiled spring together with a long-sized hydraulic damper to make its stroke long if it is to maintain good shock-absorbing performance. With their lengths increased as above, there result such problems as an increased weight and an increased height of the gravitational center.

In the conventional shock absorber disclosed in the second prior art example above, the coiled spring is interposed between the swing arm and the frame assembly as in the first prior art example above, so that said shock absorber should have the same problems as the former in terms of the weight and the center of gravity of the coiled spring. In the third example of the prior art, the torsion bar should provide dual functions, one as a pivot pin and the other as a spring, so that it is difficult to design such a torsion bar serving the two purposes.

In addition, in the first and second prior art examples, the shock absorber occupies the under-frame space up to the upper end thereof, thus leaving a lesser space for installing an air cleaner and an oil tank or the like of the engine, which is another problem or disadvantage.

Therefore, it is much desired to have a shock absorber for a motorcycle which can be mounted on so low a position as to help significantly lower the height of gravitational center of a motorcycle and which is so small-sized as to leave thereabove enough space for installing other components.

Furthermore, the rotary type hydraulic damper mounted concentrically with the pivot of the swing arm in this type of the absorber can only swing for the same magnitude of angle as the swing arm can, and that mounted right above the pivot also has about the same swing angle as that of the swing arm because it is connected to the swing arm to have about the same arm length. Thus in either case, the stroke is small. Because of this, it is difficult to cause the oil to flow in a sufficient amount necessary to effect damping of shocks or vibrations. This makes it necessary to either reduce the cylinder volume or provide double oil chambers. It is thus unavoidable to make the shock absorber rather large-sized and more complex.

It is, therefore, strongly desired to obtain a shock absorber for a motorcycle which is small-sized to be mounted at a lower position and which is efficient enough to provide effective buffer action.

In the foregoing hydraulic damper, whether it is an linear expansion type or a rotary type, the vibration damping action is constant regardless of the damper being located above or below the frame if speed of vibration is equal. Therefore, in the bottoming position where a large load is applied, that is, in the neighborhood of the lower limit position of the frame assembly, the buffer action becomes insufficient so that the riding quality or comfort becomes poor.

As a means to improve this riding quality or comfort, it has been known to increase the cushion ratio which is ratio of a load applying to the swing arm at the upper-limit position of the frame assembly where the coiled spring is fully expanded to a load acting on the damper at the lower-limit position of the frame assembly. However, there has not been known as yet a simple mechanism therefor which brings about the above desired effect.

OBJECT AND SUMMARY OF THE INVENTION

The present invention has for its object to provide a shock absorber for a motorcycle which is free from the foregoing problems. According to this invention, means to solve these problems include: that a supporting spring and a hydraulic damper are disposed separately so that one of them may be located above a swing arm and the other may be located therebelow, whereby height of gravitational center of a motorcycle is lowered and at the same time there is made available above the swing arm more space for installing other components; that a rotary type hydraulic damper is so positioned as to have its cushion arm extend rearwards and said arm is connected at a right angle to a cushion bar extending upwards from the swing arm, so that stroke of the rotary damper is made longer and at the same time the cushion ratio is varied for improvement of the riding quality; and that the cushion bar is made to be adjustable in its length so as to permit adjsutment of the damping characteristic of the damper. Further, according to the present invention, a supporting spring is interlinked to the swing arm on one side and the rotary damper is interlinked to the swing arm on the other side so that forces acting on the vehicle body therethrough can be distributed to the left and right sides equally. This prevents torsion of the vehicle body or the swing arm.

DETAILED DESCRIPTION OF PREFERRED EMBODIMENTS

Preferred embodiment examples of the present invention will now be explained with reference to the accompanying drawings.

EXAMPLE 1

Figure 1:
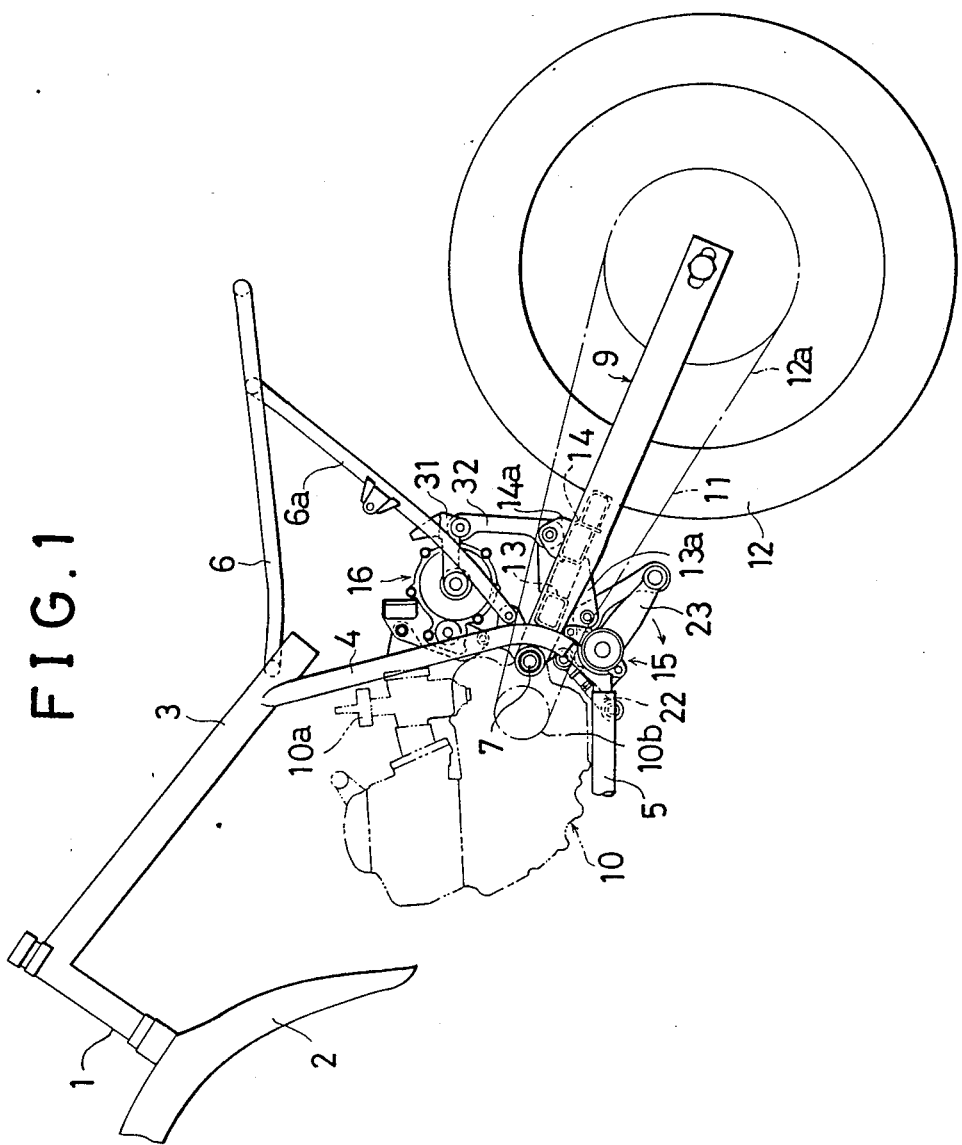
FIG. 1 is a side view of one embodiment example of the present invention.

Referring to FIG. 1, reference numeral 1 denotes a head pipe of a two-wheeled motorcycle, 2 denotes a fender, 3 represents a main frame, and 4 and 5 represent respectively a longitudinal frame and a lower frame which are integrally combined with each other. The upper end of the longitudinal frame 4 is securely attached to the main frame 3. A seat frame 6 is also connected to the main frame 3. A stay 6a for the seat frame 6 is connected to the longitudinal frame 4. These arranged as above form the vehicle body of a motorcycle.

A swing arm 9 is pivotally attached to a pivot 7 located near the lower portion of the longitudinal frame 4 and an engine 10 is mounted above the lower frame 5. The engine 10 is provided with a carbureter 10a which takes in air from the upper rear of the engine and with a driving sprocket 10b which is exposed at the lower side portion of the engine. The sprocket 10b combined with a chain 11 drives a sprocket 12a of a rear wheel 12.

Figure 3:
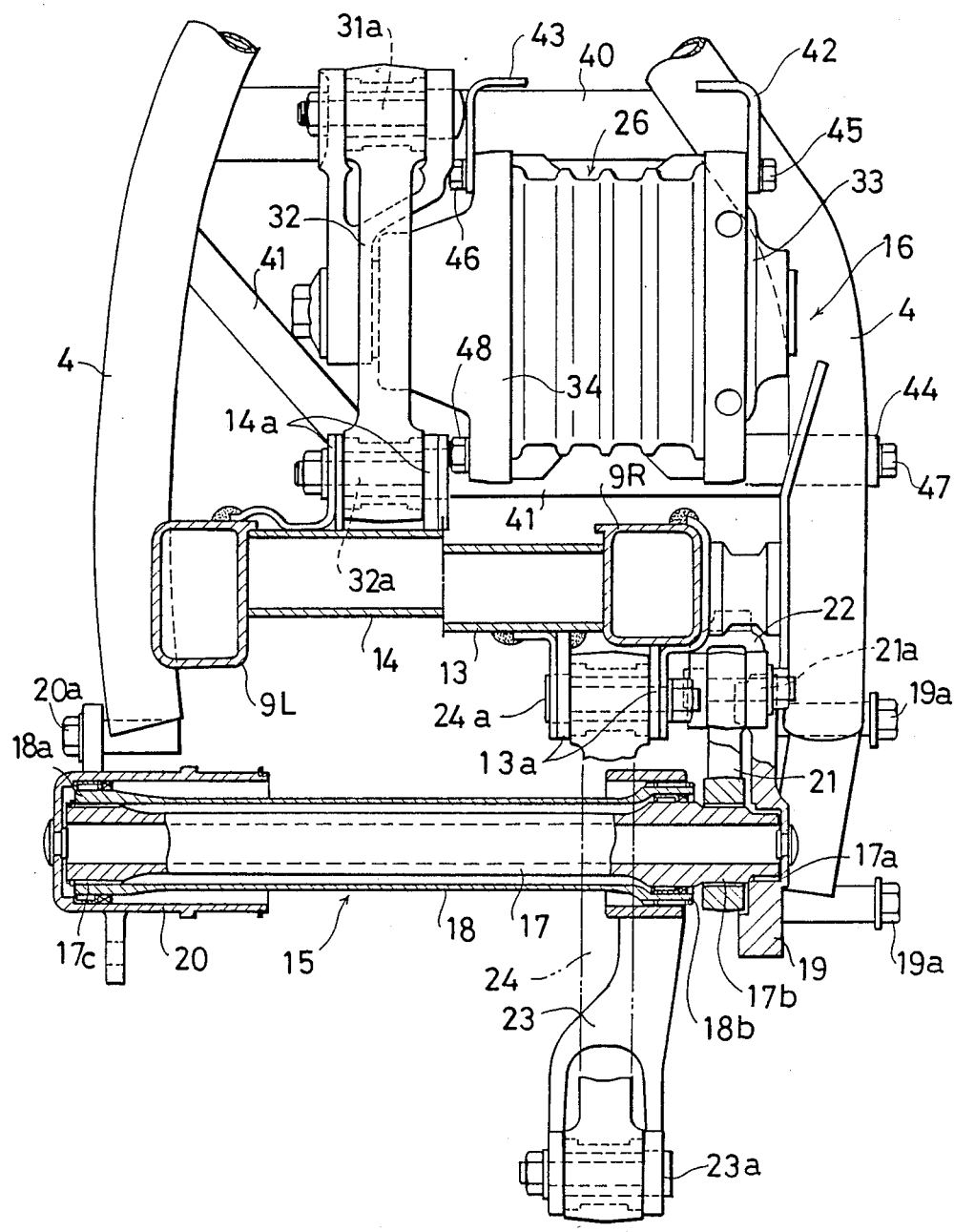
FIG. 3 is a rear view thereof.
Figure 4:
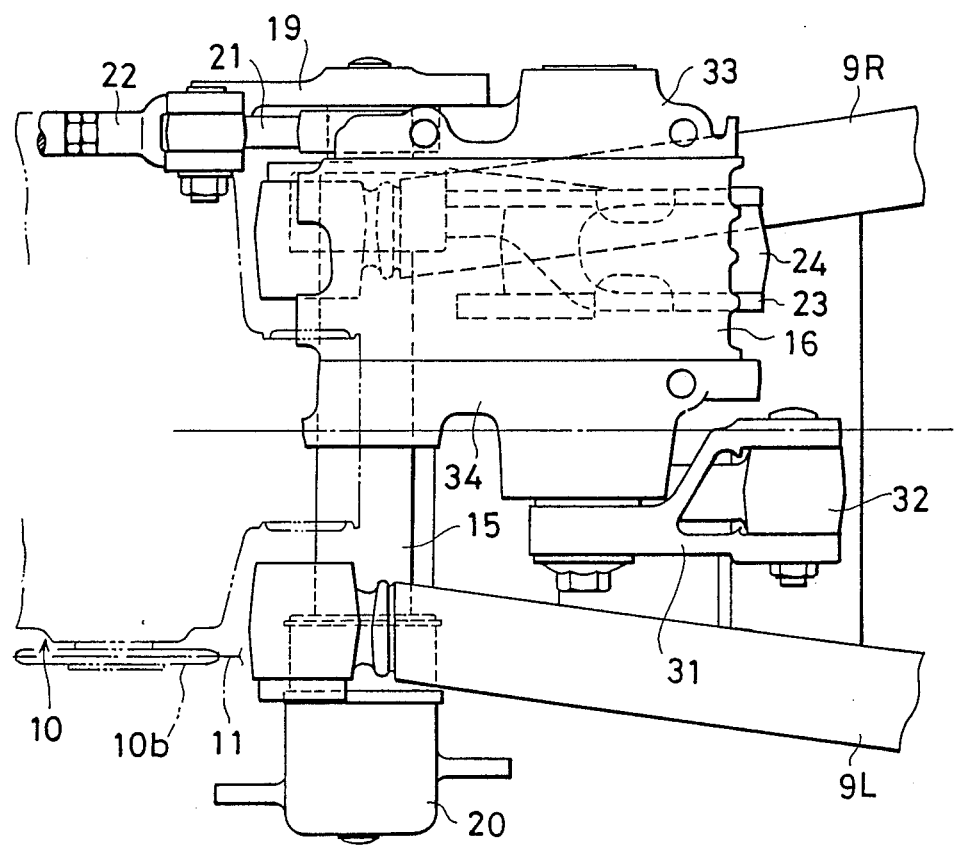
FIG. 4 is a top plan view thereof.

As is clear from FIGS. 3 and 4, the swing arm 9 comprises a pair of a left arm 9L and a right arm 9R. The two arms are connected to each other by cross members 13, 14. A pair of downward facing brackets 13a are securely mounted on and across the right arm 9R and the cross member 13 while a pair of upward facing brackets 14a are securely mounted on and across the left arm 9L and the cross member 14. Consequently, the brackets 13a are located on the right side with respect to the center line of the vehicle body while the brackets 14a are located on the left side also with respect to said center line, said brackets 14a being closer to the center line than the chain 11.

Figure 2:
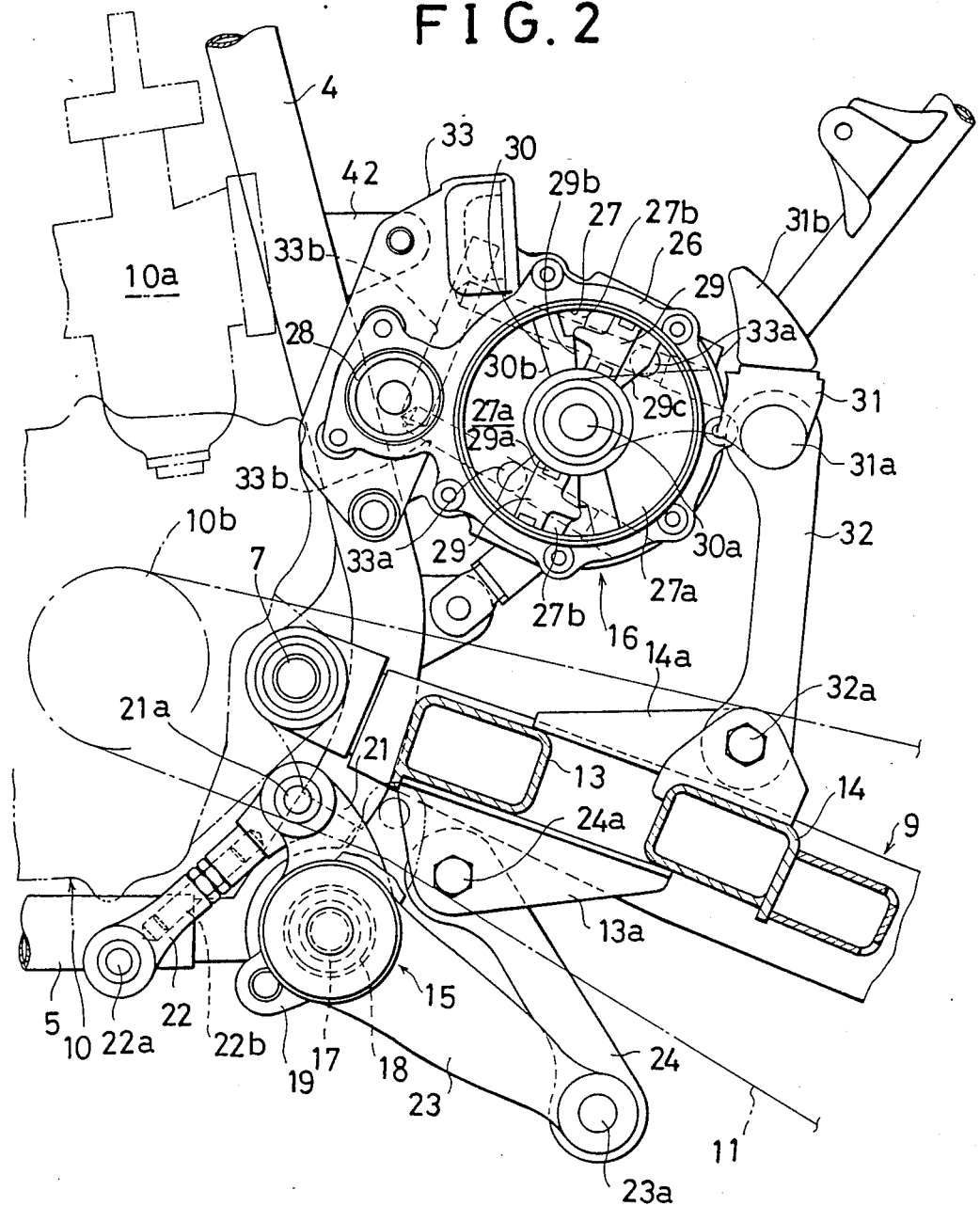
FIG. 2 is a detail diagram showing important parts thereof.

A shock absorber supporting the swing arm 9 comprises a torsion spring 15 mounted on and across the lower portion of the longitudinal frame 4 and the lower frame 5, and a rotary type hydraulic damper 16 so mounted on the middle portion of the longitudinal frame 4 as to face rearwards. The mounting location of the torsion spring 15 is farther backward than that of the driving sprocket 10b and below the chain 11 while the mounting location of the rotary damper 16 is farther backward than that of the torsion spring 15 and above the chain 11 and such that the upper end of the damper may not be positioned higher than the upper edge of the intake port of the carbureter 10a. Both the torsion spring and the damper are positioned so that they may be close to the pivot 7 and their axial lines run in the direction of the vehicle width. As shown in FIGS. 2 and 3, the torsion spring is of double spring construction comprising a hollow inner spring 17 and an outer spring 18. The inner spring 17 has a bearing portion 17a and splines 17b, 17c while the outer spring 18 has an interconnecting portion 18a which is spline-connected to the spline 17c and an outer end portion 18b whose inner surface is supported by the inner spring 17 and whose outer periphery is provided with a spline. This torsion spring 15 is supported at its base by a side cap 19 which is externally fitted onto the bearing portion 17a and attached to the right longitudinal frame 4 while the interconnecting portion 18a is supported by another side cap 20 which is externally fitted onto the interconnecting portion 18a and attached to the left longitudinal frame 4. The side caps 19 and 20 are securely fixed to the respective frames by bolts 19a and 20a respectively. By covering both sides of the spring with the side caps 19 and 20 fitted thereto as described in the foregoing, the outer spring 18 is protected against muddy water or the like that could otherwise enter the inside of the outer spring 18.

An adjusting arm 21 is connected to the spline 17b of the inner spring 17, an adjuster 22 is connected to the outer end of the adjusting arm by means of a pin 21a, and the other end of the adjuster 22 is connected to the lower frame 5 by means of a pin 22a.

The adjuster 22 is a known type comprising an adjuster screw 22b consisting of right-hand and left-hand screws and an internal thread portion provided to have the respective screws mesh therewith, so that a preset load of the torsion spring 15 is adjusted by changing a distance between the pin 21a and another pin 22a by turning the adjuster screw 22b.

The base end of a supporting arm 23 is connected to the spline of the outer end portion 18b of the outer spring 18 and a supporting link 24 is connected to the top end of the supporting arm through a pin 23a and to the bracket 13a of the swing arm 9 through a pin 24a. In FIGS. 1 and 2, the torsion spring 15 gives clockwise turning force to the supporting arm 23 and the swing arm 9, whereby the frames 4 and 5 are resiliently pushed on upwards.

By providing the torsion spring 15 so as to be located at the lower rear ends of the frames 4 and 5 as described above, it is made possible to remarkably lower the gravitational center of said spring and in addition minimize the required torsion amount of the torsion spring 15 to reduce the length of said spring because the swing arm is supported at a portion near the pivot 7 thereof.

The rotary damper 16 which absorbs vibrational energy of the vehicle body has a casing 26 which is shown in FIG. 2. The casing 26 is provided therein with a cylinder 27 and an adjusting valve hole 28. The cylinder 27 has a pair of partition walls 29,29 fixed to the inner circumference thereof and extending therefrom along a diametrical line thereof. A sealing surface 29a is formed on the inner circumferential surface of the partition wall while stoppers 29b, 29c are formed on both sides thereof in the circumferential direction.

A rotating piston 30 carries a piston shaft 30a and a pair of cushion vanes 30b. There are thus formed in the cylinder 27 by these two vanes and the foregoing two partition walls 29a a pair of separated chambers 27a and another pair of separated chambers 27b, two pairs in all. The piston shaft 30a is projecting outwards and a cushion arm 31 is securely fastened thereto. The cushion arm is further connected to the swing arm 9 via a pin 31a, a cushion bar 32, a pin 32a and the bracket 14a. Securely fastened to the outer end of the cushion arm 31 is an elastic member 31b facing the direction opposite to that of the cushion bar.

As shown in FIG. 3, both sides of the casing 26 are closed by a pair of closure members 33, 34 while the separated chambers 27a and 27b are communicated with the interior of the adjusting valve hole 28 through oil passages provided in both the closure members 33, 34. Shown in FIG. 2 is one closure member 33 in which are provided a pair of oil ports 33a, 33a fronting the separated chamber 27a, said oil ports 33a, 33a being communicated with each other and with the interior of the adjusting valve hole 28 through the oil passages 33b.

In the other closure member 34 on the other side, there are provided another pair of oil ports fronting the separated chamber 27b and positioned at locations symmetrical to the foregoing oil ports 33a, 33a with respect to the partition walls 29, 29, these oil ports being communicated at different locations with the adjusting valve hole 28 through a means similar to the foregoing oil passage 33b. Through an adjusting valve body (not shown) fitted into the hole 28, the oil passages in both of the closure members are communicated with each other in such a manner that the oil flow rate may be controlled by narrowing the flow passage to obtain a suitable damping effect.

It is possible to provide in only one of the two closure members the oil passages communicating with both of the separated chambers in stead of providing them separately in both of them.

In order to fasten this rotary damper 16 to the vehicle body, such fixing members as brackets 42, 43 and a fixing sleeve 44 or the like are attached to the longitudinal frame 4, a cross member 40, and a curved cross member 41 or the like (see FIG. 3). Bolts 45, 46, 47, 48 are inserted through these fixing members and screwed into screwholes provided in the closure members 33, 34 of the damper to fasten the damper securely to the vehicle body. The fixed position of the damper 16 is, as is clear from FIGS. 3 and 4, deviated to be closer to the right arm so that it is out of alignment with the sprocket 10b and the chain 11 in the direction of vehicle width. This prevents the damper 16 and the chain 11 from interfering with each other even when the vehicle body sinks to the lower-limit position.

Figure 5:
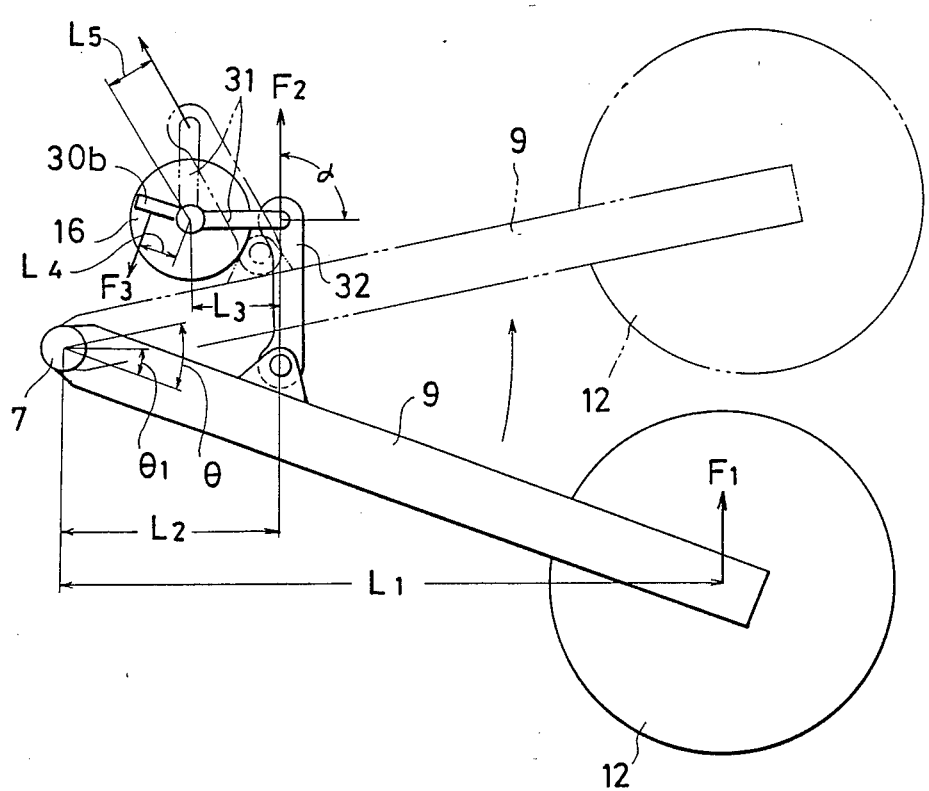
FIG. 5 is a diagram for explaining operation of a rotary damper thereof.

As shown in FIG. 5, swing angle $\theta$ of the swing arm 9 is normally restricted to about 30°. Although there occurs a decrease in the angle by $\theta_1 = 10°$ when an average driver gets on the motorcycle, the swing arm still swings for and within the above mentioned range of $\theta$ due to vertical vibrations of the vehicle body. In addition, the cushion arm 31 and the cushion bar 32 of this rotary damper 16 are made to have such dimensional and positional relationship that they are at right angles to each other when the frame assembly of the motorcycle is at its upper-limit position with the spring expanded to its maximum extent. With the frame assembly coming down, the cushion arm 31 is turned more than 90° so that an angle formed between the cushion arm 31 and the cushion bar 32 may become gradually smaller. With the respective component members arranged as described in the foregoing, there is obtained a desirable cushion ratio resulting in good riding quality.

In FIG. 5, $F_1$ represents a load applying to the swing arm when the frame assembly is at its upper-limit position, $F_2$ represents force generated in the cushion bar 32 under the foregoing condition, $L_1$ denotes a length from the pivot 7 to the axle of the rear wheel, $L_2$ denotes a length from the pivot 7 to the cushion bar 32, $L_3$ denotes a distance from the line of action of $F_2$ to the axial center of the rotary damper 16, $L_4$ denotes a distance from the center of the cushion vane 30b to the axial center of the rotating piston 30, and $F_3$ denotes a load at the center of the cushion vane 30b. From equilibrium of the moment, $$F_1 \cdot L_1 = F_2 \cdot L_2 \therefore F_2 = F_1 \cdot L_1 / L_2$$

$$F_2 \cdot L_3 = F_3 \cdot L_4 \therefore F_3 = F_2 \cdot L_3 / L_4$$

From the above equations, $F_3 = F_1 \cdot L_1 / L_2 \cdot L_4$

The cushion ratio is ration of the rear wheel axle load to the damper load and in this case it is expressed as $F_1/F_3$. The greater this value is, the better the riding quality. From the above expression, the following equation, $F_1/F_3 = L_2 \cdot L_4 / L_1 \cdot L_3$ is obtained. When the position of the frame assembly is changed from the upper limit position to the lower limit position, $L_4$ remains constant and both $L_1$ and $L_2$ are subjected to only a small change, so that $L_2 \cdot L_4 / L_1$ is regarded practically as a constant. In contrast to the foregoing, $L_3$ changes significantly along with the stroke to become $L_5$ at the lower-limit position of the frame assembly, said $L_5$ amounting approximately to $\frac{1}{2}$ of $L_3$ while the cushion ratio is increased about twofold. When the cushion ratio is larger, the shock absorption capability for a large load is greater so that it can sufficiently absorb shock energy generated when the vehicle body goes down, thereby providing a good riding quality, that is, a comfortable ride.

Furthermore, according to the present invention, the rotary type hydraulic damper 16 is disposed rearwardly of the pivot 7 of the swing arm 9 and connected to the swing arm by the link mechanism, so that swing of the swing arm 9 is transmitted as an angular swing motion enlarged with respect to lengths $L_2$ and $L_3$, thus causing the cushion arm 32 to swing a large angle.

Consequently, the damper 16 is caused to act with a longer stroke and can provide sufficient damping ability even if made smaller in size. This results in reduction in size and weight of the damper. In addition, since the damper is disposed at a lower position relatively close to the center of the motorcycle, it serves, in cooperation with the torsion spring 15 disposed at a lower location, for concentration of weight and lowering of the center of gravity, thereby helping to improve stability characteristic of the motorcycle. Another advantage is that there is made available above the damper enough space in which an air filter and oil tank or the like can be installed. This helps make designing of a motorcycle easier.

In addition, since the bracket 13a which the elastic force of the torsion spring 15 acts on and the bracket 14b which the resistance force of the rotary damper 16 acts on are so disposed that one of them may be located on the left side with respect to the center line of the vehicle body and the other one on the right side, the torsional moment applying to the swing arm 9 is offset by the foregoing elastic force and resistance force, whereby the torsional vibration can be kept to a minimum.

In the foregoing embodiment example, it is so arranged that the cushion arm 31 is about horizontal when the frame assembly has moved to its upper limit position and that said arm 31 swings upwards as the frame assembly moves downward. However, it can be so arranged that the arm 31 may be tilted somewhat downward when the frame assembly is at its upper-limit position and the stroke of the damper is made longer thereby for further improvement of the damping performance.

In the above embodiment example, the torsion spring is disposed at the lower position and the rotary damper is disposed at the upper position. This relationship may be reversed if so desired.

EXAMPLE 2

Another embodiment example of the present invention will now be described with reference to FIG. 6 and those figures that follow.

Figure 6:
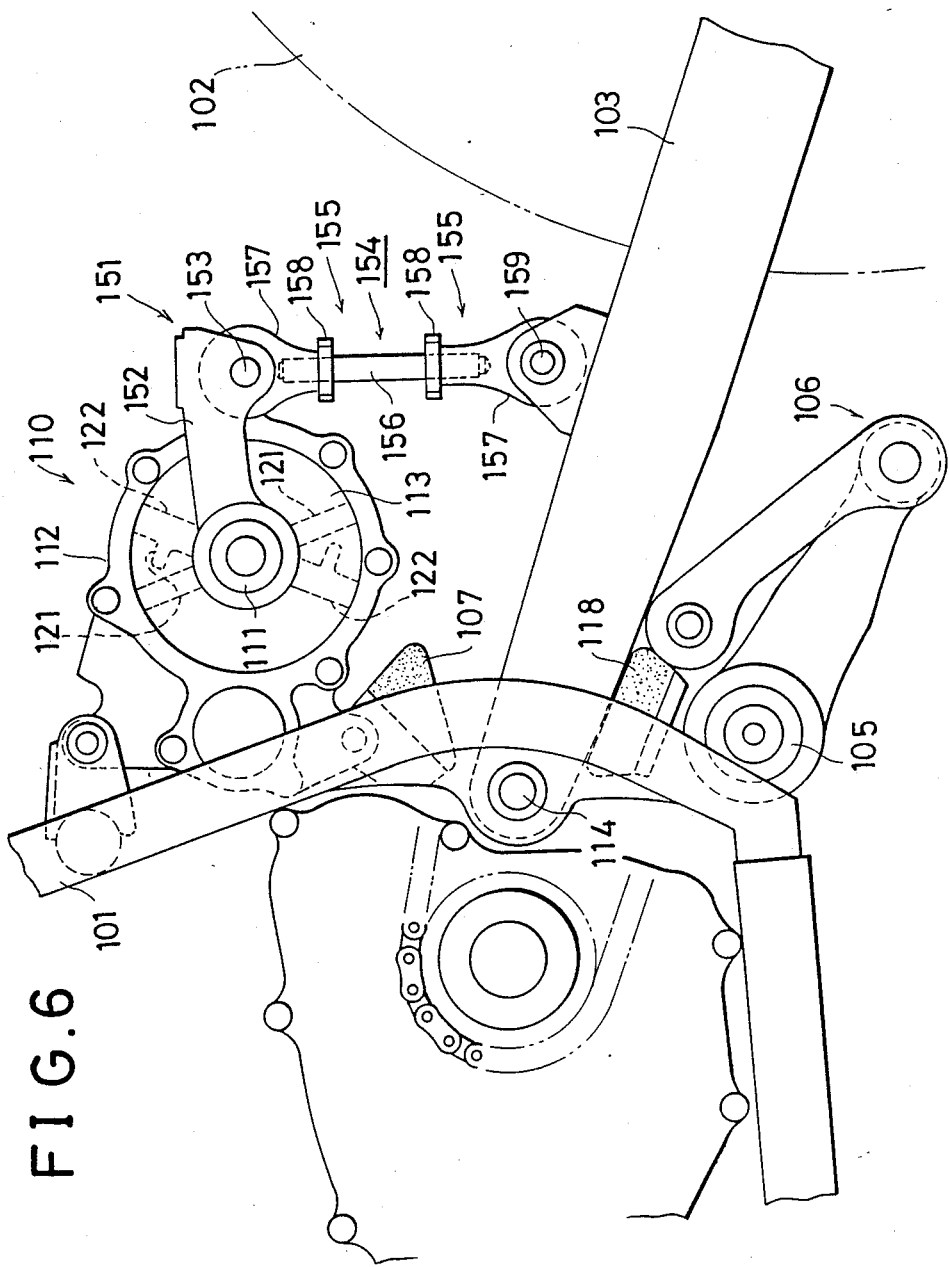
FIG. 6 is a side view of another embodiment example of the present invention.

FIG. 6 is a side view of an important portion of another embodiment example in which the present invention is applied to the rear wheel suspension of a two-wheeled motorcycle. A swing arm 103 which supports the axle of a rear wheel 102 with respect to a longitudinal frame 101 is pivotally supported at a pivot 104 so as to be vertically swingable. A rotary type hydraulic damper 110 is disposed above the front portion of the swing arm 103.

Figure 7:
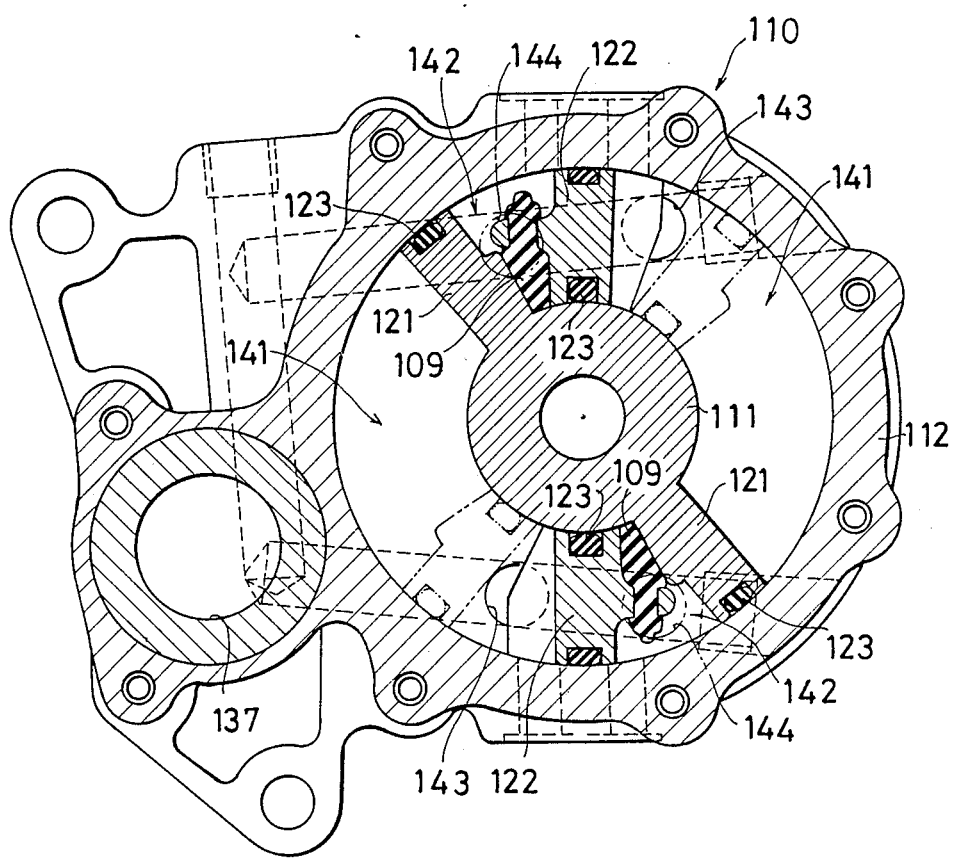
FIG. 7 is a longitudinal sectional view of a rotary type hydraulic damper thereof.
Figure 8:
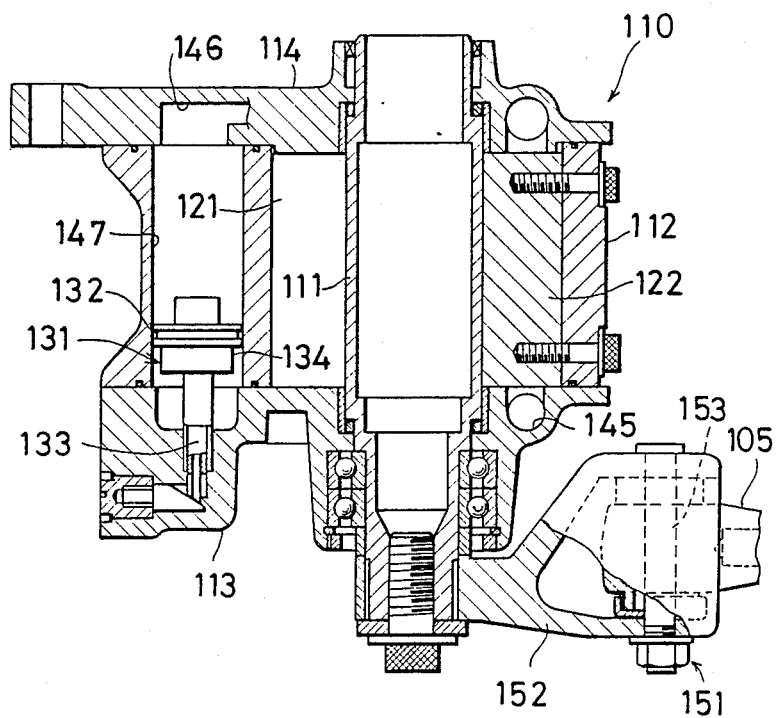
FIG. 8 is a break expansion plan showing a cross section of said damper as well as a diagram of a link mechanism thereof as viewed from above.

As shown in FIGS. 7 and 8, the rotary type hydraulic damper 110 comprises a rotating shaft 111 extending laterally, a tubular casing 112 which is circular in section, closure members 113, 114, vanes 121, 122, and a damping power generation means 131, said damping power generation means 131 being provided with a piston 132, an orifice member 133 and a valve 134. There are provided on the outer circumference of the rotating shaft 111 a pair of vanes 121 which are integrally built therewith and extend therefrom respectively in a diametrically opposite direction. Both the vane 121 and the rotating shaft 111 are made of a sintered material. There are also provided on the inner circumference of the casing 112 a pair of vanes 122 which are fastened thereto by bolts in such a way that they may extend respectively in a diametrically opposite direction and which are provided with sealing members 123 interposed at the sliding and the joint portions thereof. As the rotating shaft 111 is so inserted into the casing 112 as to be concentric with the casing and the closure members 113, 114 are fastened respectively to the left and right sides of the casing 112 by means of bolts, there are formed in the casing 112 oil chambers 141, 142 alternate in order in the circumferential direction. The rotating shaft 111 is rotatably supported in the closure members 113, 114 while the closure member 113, 114 now integrally attached to the casing 112 are fastened to the longitudinal frame 101 by means of bolts.

In the foregoing rotary type hydraulic damper 110, both of the oil chambers 141, 144 are communicated with each other through oil ports 143, 144, oil passages 145, 146, and a valve chamber 147 while said damping power generation means 131 is housed in the valve chamber 147.

A link mechanism 151 is interposed between the projecting and portion of the rotating shaft 111 projecting out of the closure member 113 and the upper front portion of the swing arm 103. The link mechanism comprises an arm 152 and a link member 154. The link member 154 is provided with a length adjusting portion 155. More specifically, the arm 152 is connected to the projecting end portion of the rotating shaft 111 through serration engagement and bolt fastening while the link member 154 is connected to the rear end of the arm 152 via a pivot 153. The lower end of the link member 154 is connected to the upper front portion of the swing arm 103 via another pivot 159.

The link member 154 comprises a rod 156 and an upper end and a lower end pieces 157. Both end portions of the rod 156 are provided respectively with a right hand screw and a left hand screw so that they can be screwed into the end pieces 157, 157. The rod 156 is turned by means of pliers or the like for length adjustment of the link member. The link member 154 is then securely held in the selected length position by nuts 158, 158.

When the swing arm 103 is caused to swing upwards due to the bounding action of the rear wheel, the rotating shaft 111 of the rotary type hydraulic damper 110 is caused through the link mechanism to rotate counterclockwise as indicated by imaginary lines in FIG. 7, and the hydraulic oil caused to flow from the oil chamber 141 on the compression side by rotation of the vane 121 flows into the oil chamber 142 on the expansion side while causing the damping power generation means to generate a damping power. A torsion bar 105 and another link mechanism 106 are provided to form a link between the swing arm 103 and the longitudinal frame 101. Urged by resilience of the torsion bar 105, the swing arm 103 performs its return operation. In case of the rebounding action, the rotational direction of the vanes 121 on the rotating shaft and the flow direction of the hydraulic oil are reverse to those in case of the bounding action discussed above.

The swing of the swing arm 103 caused by the bounding and rebounding actions of the rear wheel are controlled by rubber stoppers 107, 108 which are so provided on the longitudinal frame 101 as to have one of them located above the pivot 104 and the other located below said pivot. The vane 122 attached to the casing and provided in the damper 110 is likewise provided with a rebound rubber stopper 109.

In the foregoing arrangement, the damping power characteristic of the rotary type hydraulic damper 110 can be easily adjusted by changing the length of the link member 154.

Figure 9:
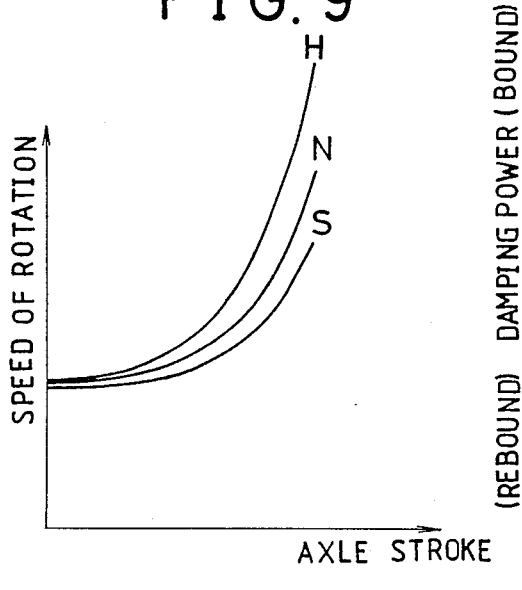
FIG. 9 is a diagram showing stroke/lever ratio characteristic.
Figure 10:
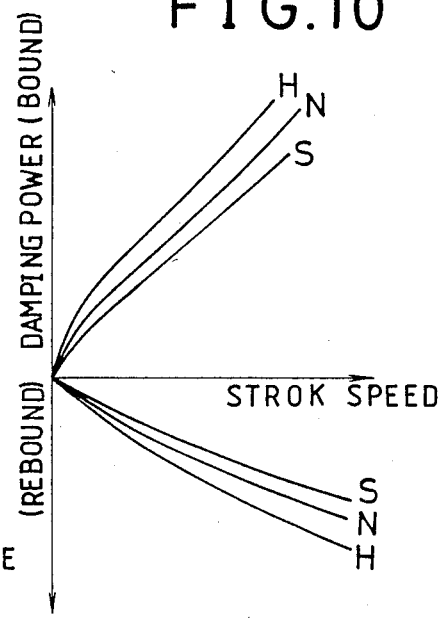
FIG. 10 is a diagram showing stroke speed/damping power characteristic.

For running on a hard road, the link member 154 is made longer by adjusting the vertical length thereof with the length adjusting portion 155, so that angle of rotation of the vane 121 on the shaft of the rotary type hydraulic damper 110 relative to the vertical stroke of the rear wheel axle becomes larger as indicated by the locus H in FIG. 9. In other words, speed of rotation of the vane 121 on the shaft relative to the stroke of the rear wheel axle is increased as indicated by the characteristic curve H in FIG. 9, and with this increase in speed of rotation of the on-shaft vane 121, the damping power increases as indicated by the characteristic curve H in FIG. 10. Therefore, it can cope with a large load associated with a hard road.

On the other hand, for running on a soft road, the link member 154 is made shorter by making a length adjustment in the similar manner as mentioned above, so that angle of rotation of the on-shaft vane 121 relative to the vertical stroke of the rear whee axle becomes smaller as indicated by the locus 8 in FIG. 9. In other words, the speed of rotation of the on-shaft vane 121 relative to the stroke of the rear wheel axle becomes slower as indicated by the characteristic curve S in FIG. 9 and with this decrease in speed of rotation of the on-shaft vane 121, the damping power becomes smaller as indicated by the characteristic curve S in FIG. 10. Therefore, it can also cope with a small load associated with a soft road.

With the link member 154 set to the intermediate length, there can be obtained the normal characteristic curve N corresponding to a normal road.

In the foregoing, description was made of a case in which the damping power of the damper was varied in three steps according to each of three road conditions, hard, normal and soft. However, the construction of the length adjusting portion 155 is such that length of the link member 154 can be adjusted steplessly for stepless adjustment of the damping power.

In this embodiment, specifically described is the case where the damper of the present invention is applied to the rear wheel suspension of a two-wheeled motorcycle. However, said rotary type hydraulic damper is equally applicable to such suspension systems of general motor vehicles as a trailing arm type suspension system or the like. It is also possible that the shaft member of the rotary type hydraulic damper is supported on the vehicle body and the link mechanism is interposed between the casing of the damper and the swing arm so as to link the two. As for number of the oil chambers, two or more will do.

As described in the foregoing, according to the shock absorber disclosed in this embodiment example, angle of rotation of the rotary type hydraulic damper is varied by simply changing length of the link member so as to easily adjust the damping power characteristic of the damper. In addition, since the length adjusting portion is provided on the practically vertically extending link member which is thus free from bending load, the damper according to the present invention features the effective damping power characteristic adjustment function obtained from a lightweight and compact structural arrangement.

While the invention has been particularly shown and described in reference to preferred embodiments thereof, it will be understood by those skilled in the art that changes in form and details may be made therein without departing from the spirit and scope of the invention.

What is claimed is:

1. A shock absorber for a motorcycle comprising a swing arm connected to a frame through a pivotal axis; a rotary supporting spring operably connected to the frame; and a hydraulic damper operably connected between the frame and the swing arm, each of the supporting spring and hydraulic damper having a base portion and an operating end portion, wherein the supporting spring and the hydraulic damper are separately disposed to thereby locate the hydraulic damper above the swing arm and the supporting spring below the swing arm, the axes of the supporting spring and the hydraulic damper being parallel to the pivotal axis; and a link means for connecting the operating end portions of the supporting spring and hydraulic damper to the swing arm, wherein the base portions of the supporting spring and hydraulic damper are connected to the frame, wherein the supporting spring and the hydraulic damper are both disposed near the pivotal axis of the swing arm, and wherein the damper is disposed rearward of the supporting spring.

2. A shock absorber for a motorcycle according to claim 1, wherein the damper located above the swing arm is a rotary type hydraulic damper and a cushion arm integrally fastened to a piston shaft of the damper is arranged to extend rearwards and connected to a cushion bar which is connected in an upright position to the swing arm, wherein a first distance is defined between the pivotal axis of the swing arm and the cushion bar, wherein a second distance is defined between a line of force applied along the cushion bar and the axis of the rotary damper, and wherein the first distance is greater than the second distance.

3. A shock absorber for a motorcycle according to claim 2, wherein the cushion arm integrally fastened to the piston shaft of the damper is perpendicularly connected to the cushion bar.

4. A shock absorber for a motorcycle according to claim 1, wherein the hydraulic damper is a rotary type hydraulic damper having a damping power generation means, and a length adjusting portion provided in the link means for connecting the operating end portion of the rotary damper to the swing arm, the link means being adjusted in length to thereby adjust the operating range of the rotary damper.

5. A shock absorber for a motorcycle according to claim 1, wherein the supporting spring is a torsion spring, said torsion spring and the rotary damper are disposed near said pivot, said motorcycle having a body, and the torsion spring and the operating end portion of the rotary damper are so positioned that one of them may be located on the left side of a center line of the motorcycle body and the other on the right side thereof and, in such condition, connected to the swing arm via a link means.

6. A shock absorber for a motorcycle according to claim 1, wherein the supporting spring and the hydraulic damper are both disposed rearward relative to the pivotal axis of the swing arm.

7. A shock absorber for a motorcycle according to claim 6, wherein the hydraulic damper is disposed further back from the pivotal axis of the swing arm than the supporting spring.

8. A shock absorber for a motorcycle according to claim 1, wherein the hydraulic damper is a rotary type hydraulic damper.

9. A shock absorber for a motorcycle according to claim 1, wherein axial lines along the supporting spring and the hydraulic damper extend along the width of the motorcycle.

* * * * *